United States Patent
Matsumura

(10) Patent No.: US 8,869,848 B2
(45) Date of Patent: Oct. 28, 2014

(54) MOTORCYCLE TIRE FOR RUNNING ON ROUGH TERRAIN

(75) Inventor: Sadahiko Matsumura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 584 days.

(21) Appl. No.: 13/117,738

(22) Filed: May 27, 2011

(65) Prior Publication Data

US 2011/0290390 A1    Dec. 1, 2011

(30) Foreign Application Priority Data

May 28, 2010 (JP) ................................ 2010-123157

(51) Int. Cl.
- *B60C 11/11* (2006.01)
- *B60C 11/01* (2006.01)
- *B60C 11/00* (2006.01)

(52) U.S. Cl.
CPC ......... *B60C 11/0083* (2013.04); *B60C 2200/10* (2013.04); *B60C 2200/14* (2013.04); *B60C 11/11* (2013.01); *Y10S 152/902* (2013.01)
USPC ............ 152/209.11; 152/209.15; 152/209.16; 152/902

(58) Field of Classification Search
CPC   B60C 11/0083; B60C 11/11; B60C 2200/10; B60C 2200/14; B60C 11/0306; B60C 11/033; B60C 11/0332; B60C 2011/0033; B60C 2011/01; B60C 11/01

USPC .................. 152/209.11, 902, 209.15, 209.16, 152/209.14, 209.1

See application file for complete search history.

(56) References Cited

U.S. PATENT DOCUMENTS

2008/0283167 A1 *  11/2008  Matsumura ............... 152/209.11

FOREIGN PATENT DOCUMENTS

| DE | 3411667 | * 11/1984 |
|---|---|---|
| EP | 1992504 A1 | 11/2008 |
| JP | 61-12411 A | 1/1986 |
| JP | 3-204305 A | 9/1991 |
| JP | 2007-326520 A | 12/2007 |
| JP | 2008-273422 | * 11/2008 |

OTHER PUBLICATIONS

DE 3411667, Nov. 1984, English language machine translation [retrieved from www.epo.org].*
Extended European Search Report dated Aug. 18, 2011 for European Search Report No. 11004119.1.

* cited by examiner

*Primary Examiner* — Eric Hug
(74) *Attorney, Agent, or Firm* — Birch, Stewart, Kolasch & Birch, LLP

(57) ABSTRACT

A motorcycle tire for running on rough terrain comprises a tread portion provided with shoulder blocks each provided with a ground contacting surface whose profile (contour) is a curved line having a radius of curvature not less than 200 mm or a straight line in a tire meridian section including the centroid of the ground contacting surface.

8 Claims, 6 Drawing Sheets

US 8,869,848 B2

MOTORCYCLE TIRE FOR RUNNING ON ROUGH TERRAIN

BACKGROUND OF THE INVENTION

The present invention relates to a pneumatic tire, more particularly to a motorcycle tire for running on rough terrain improved in the uneven wear resistance and cornering performance.

In general, motorcycle tires for running on rough terrain, designed for use in for example motocross race or off-road race, are provided in the tread portion with a plurality of independent blocks, for example as disclosed in JP-A-2007-326520, so that the tread blocks bite into the ground of rough terrain and provides improved off-road traction and cornering performance.

As shown in FIG. 6 for example, the tread blocks (b) of such a motorcycle tire (a) are provided with ground contacting surfaces (bs) whose profiles (contours) are an arc of a relatively small radius of curvature (rs) of about 50 to 70 mm in the meridian section of the tire including the tire rotational axis.

In such block (b), in comparison with the ground pressure in the central region (bc) of the ground contacting surface, the ground pressure at each axial edge (be) of the ground contacting surface becomes decreased. In particular, during cornering, the axial edges (be) of the axially outermost shoulder blocks (b1) do not function well and thereby the cornering performance can not be improved fully.

Further, as the shoulder blocks (b1) are subjected to large ground pressure during cornering, the amount of wear in the central region (bc) of the ground contacting surface becomes increased in comparison with the amount of wear at the axial edges (be). As a result, uneven wear is liable to occur in the vicinity of the axial edges (be),

SUMMARY OF THE INVENTION

It is therefore, an object of the present invention to provide a motorcycle tire for running on rough terrain in which, by providing shoulder blocks whose ground contacting surfaces have specifically defined profiles (contours), the uneven wear resistance and cornering performance are be improved.

According to the present invention, a motorcycle tire for running on rough terrain comprises
a plurality of independent blocks disposed in a tread portion of the tire and including axially outermost shoulder blocks circumferentially separated by axial tread grooves, wherein
each of the shoulder blocks is provided with a ground contacting surface whose profile is a curved line having a radius of curvature of not less than 200 mm or a straight line in a first meridian section of the tire including the centroid of the ground contacting surface of the shoulder block and also including the rotational axis of the tire under a normally inflated unloaded condition.

Therefore, the ground pressure of the ground contacting surface can be increased at the axial edges of the shoulder blocks during cornering. As a result, owing to the effect of the axial edges, the cornering performance of the motorcycle tire according to the present invention can be improved. Further, in comparison with the above described conventional shoulder blocks, the ground pressure distribution is evened over the ground contacting surface, and thereby, the uneven wear resistance can be improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

DESCRIPTION OF THE PREFERRED EMBODIMENTS

Figure 1:
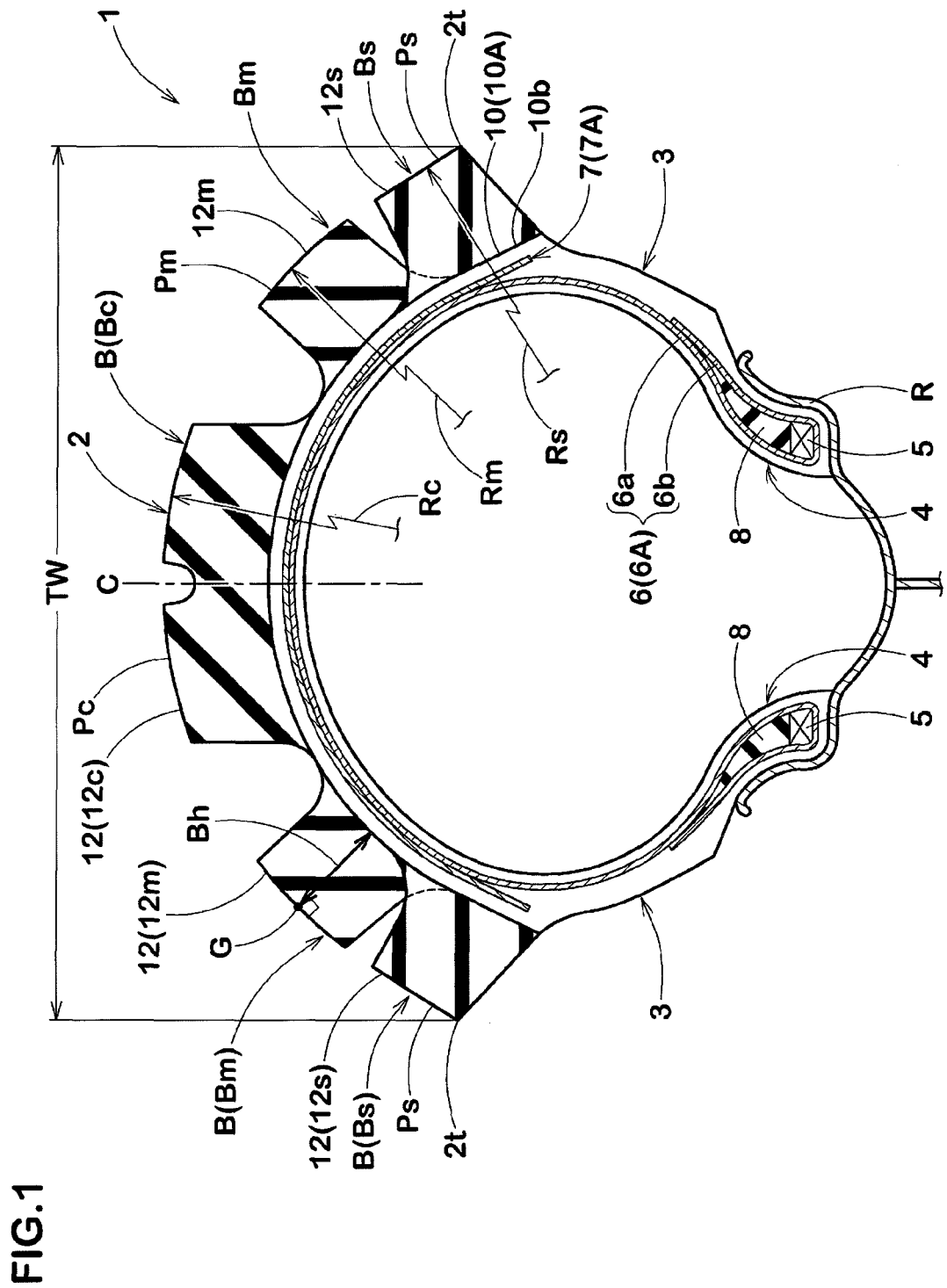
FIG. 1 is a cross sectional view of a motorcycle tire for running on rough terrain as an embodiment of the present invention.

Embodiments of the present invention will now be described in detail in conjunction with the accompanying drawings.

In the drawings, tire 1 according to the present invention comprises a tread portion 2, a pair of sidewall portions 3 extending radially inwardly from the axial edges of the tread portion, a pair of bead portions 4 positioned at the radially inner ends of the respective sidewall portions 3, a toroidal carcass 6 extending between the bead portions through the tread portion, and a tread reinforcing cord layer 7 disposed radially outside the carcass 6 in the tread portion 2.

The tread portion 2 is convexly curved so that the radially outer surface 25 of the tread portion 2 swells radially outward, and the tread width TW which is the axial distance between the tread edges 2t of the tread portion 2 becomes the maximum cross section width of the tire.

The tread portion 2 is provided with a plurality of blocks B divided by tread grooves 10.

Figure 2:
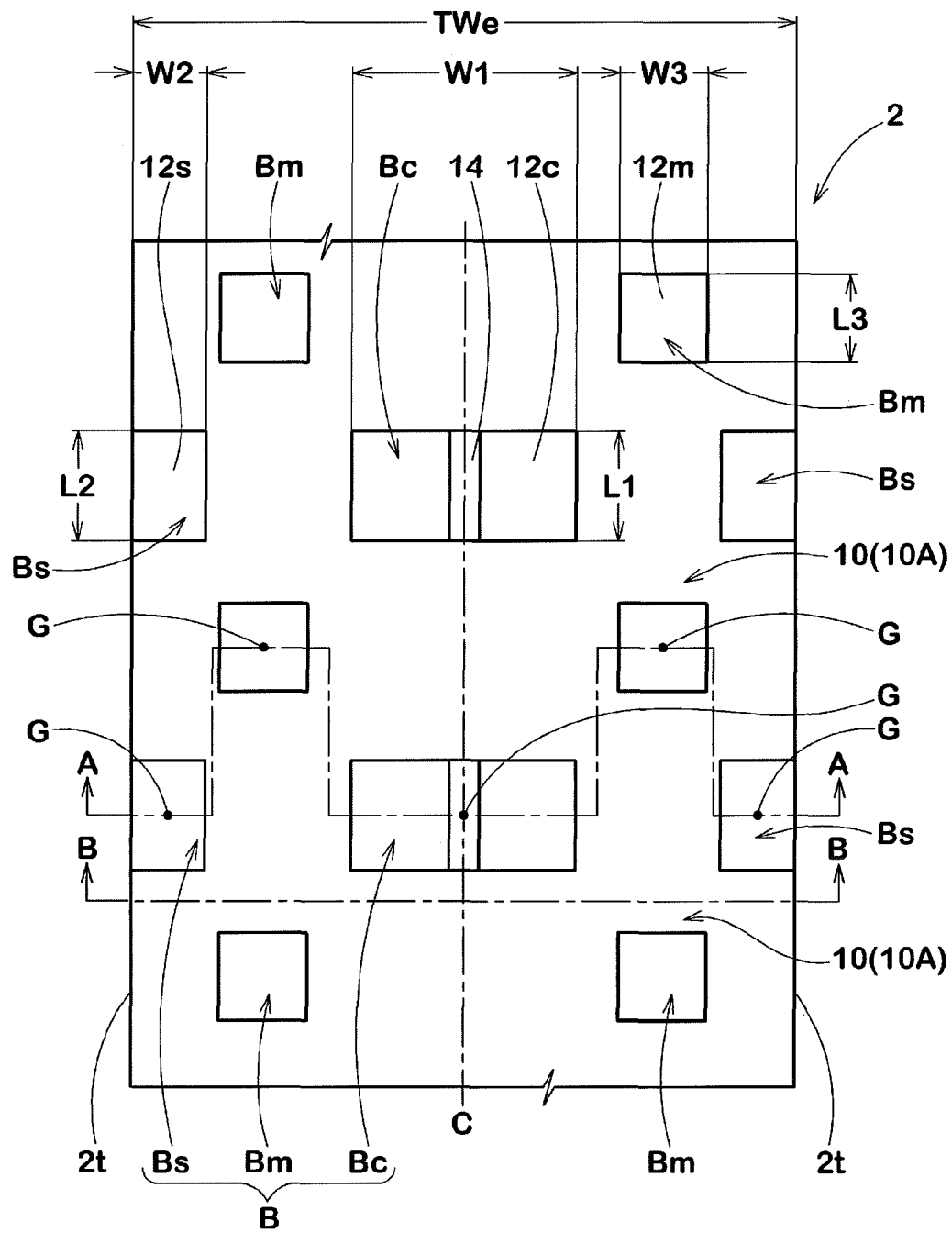
FIG. 2 is a developed view of the tread portion of the tire shown in FIG. 1.

FIG. 1 and FIG. 2 show an example of the motorcycle ti re which is designed for use in motocross race.

As shown, the tread grooves 10 in this example are broad, and the extents of the respective grooves are unclear, therefore the use of the term "groove" might be unfit. However, since the present invention can include usual grooves having relatively narrow widths, the term "groove" is used. Therefore, according to the circumstances, the term "grooves" can be read as "grooved portion", "sea area" or the like.

In FIG. 1 shown is a superimposed meridian section of the tire obtained by superimposing a first meridian section on a second meridian section. The first meridian section is a meridian section of the tire (for example, A-A section in FIG. 2) including the rotational axis of the tire and passing through the centroids G of the ground contacting surfaces 12 of some of the independent blocks B. The second meridian section is a meridian section of the tire (for example, B-B section in FIG. 2) including the rotational axis of the tire and passing through the bottoms 10b of axially extending tread grooves 10A. For easy understanding, rubber hatching in the second meridian section is omitted except for the undermentioned bead apex 8 in the bead portion.

The carcass 6 is composed of at least one, in this embodiment only one carcass ply 6A extending between the bead portions through the tread portion and sidewall portions and turned up around the bead core 5 in each of the bead portions from the axially inside to outside so as to have a pair of turned up portions 6b and a main portion 6a therebetween extending from one of the bead cores 5 to the other in a toroidal fashion.

In this embodiment, the carcass ply 6A has a radial ply structure in which carcass cords (for example, organic fiber cords) are radially arranged at an angle in a range of from 75 to 90 degrees with respect to the tire circumferential direction. However, it is also possible to adopt a bias ply structure in which the carcass 6 is composed of at least two cross plies of carcass cords arranged at angles in a range of from 75 to 45 degrees with respect to the tire circumferential direction.

In order to reinforce the bead portions 4, each of the bead portions is provided between the turned up portion 6b and the main portion 6a of the carcass ply 6A with a bead apex 8 made of hard rubber extending radially outwardly from the bead core 5.

The tread reinforcing cord layer 7 is composed of at least one, in this embodiment only one reinforcing ply 7A of reinforcing cords (for example, organic fiber cords) laid at an inclination angle in a range of from 15 to 45 degrees with respect to the tire circumferential direction.

The tread reinforcing cord layer 7 extends across almost allover the width of the tread portion 2 so as to reinforce the tread portion 2 entirely to provide increased tread rigidity.

The above-mentioned blocks B are each spaced apart from the others in both the tire circumferential direction and tire axial direction as shown in FIG. 2. Therefore, each of the tread blocks B can bite into the ground of rough terrain, and the tractional force can be increased.

In order that mud and the like can be easily self-discharged from the tread grooves during running, the tread grooves 10 are formed to have large widths.

Therefore, in this embodiment, the land ratio (sb/s) is set in a range of from 10 to 30%. Namely, the total area sb of the ground contacting surfaces 12 of all of the tread blocks B is set in a range of from 10 to 30% of the gross area S of the radially outer surface of the tread portion 2 (inclusive of the groove area).

If the land ratio (sb/s) is less than 10%, there is a possibility that the tractional force decreases on the hard or medium road surfaces. If the land ratio (Sb/S) is more than 30%, there is a possibility that the tractional force decreases on the soft road surfaces in rough terrains.

The height Bh of the tread block B is set in a range of from 6 to 19 mm for example. Here, the height Bh of the tread block B is the distance measured in the superimposed meridian section from the centroid G of the ground contacting surface 12 to the bottom 10b of the tread grooves 10A along a straight line normal to the ground contacting surface 12 as shown in FIG. 1. Therefore, the block B can bite into the ground to produce large tractional force. Further, an excessive increase in the bending moment of the block B during braking and traction is prevented and the deterioration of the durability can be prevented.

The tread blocks B include axially outermost shoulder blocks Bs, middle blocks Bm and center blocks Bc.

The shoulder blocks Bs are disposed along the tread edges 2t at intervals in the tire circumferential direction while lying axial tread grooves 10A therebetween.

The center blocks Bc are disposed on the tire equator C at intervals in the tire circumferential direction while lying axial tread grooves 10A therebetween.

The middle blocks Bm are disposed between the center blocks Bc and the shoulder blocks B s in the tire axial direction at intervals in the tire circumferential direction while lying axial tread grooves 10A therebetween.

In a tread pattern shown in FIG. 2, the shoulder blocks Bs are arranged in two circumferential rows each extending along one of the tread edges 2t.
The center blocks Bc are arranged in one circumferential row extending on the tire equator.
The middle blocks Bm are arranged in two circumferential rows each located between the row of the center blocks Bc and one of the two rows of the shoulder blocks Bs.
As to the circumferential positions of the tread blocks, each of the center blocks Bc is aligned with two of the shoulder blocks Bs on both sides thereof.
Every two of the middle blocks Bm on both sides of the tire equator C are aligned and positioned between circumferentially adjacent two sets of the aligned center block Bc and shoulder blocks Bs.

Figure 3:
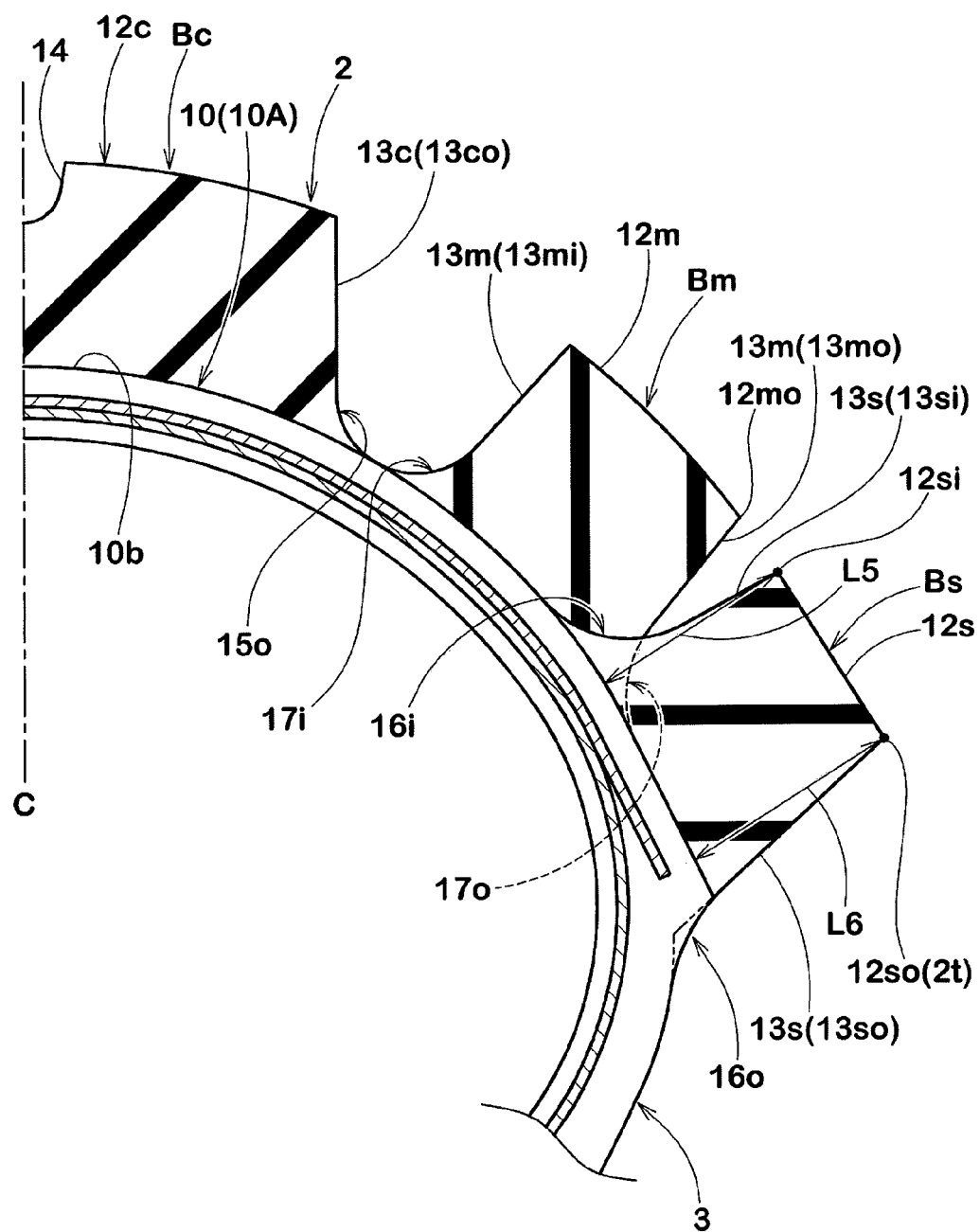
FIG. 3 is a cross sectional view of the tread portion.

Each of the center blocks BC has a ground contacting surface 12c (top surface) and a sidewall surface 13c extending radially inwardly from the peripheral edge of the ground contacting surface 12c so as to merge into the bottom of the tread grooves 10 as shown in FIG. 3.

In order to improve the traction performance during straight running, as shown in FIG. 2, the developed width W1 of the ground contacting surface 12c of the center block Bc is set in a range of from about 0.25 to 0.35 times the developed width TWe of the surface of the tread portion 2. And the developed circumferential length L1 of the ground contacting surface 12c is set in a range of from about 0.4 to 0.55 times the developed width W1.

Further, in order to improve the drainage of water and mud on hard and medium road surfaces, the ground contacting surface 12c of each of the center blocks Bc is preferably provided with a shallow groove 14 extending in the tire circumferential direction along the tire equator C. The depth of the shallow groove 14 is for example set in a range of from 20 to 30% of the height Bh of the central block.

In the first meridian section (for example, A-A section in FIG. 2), the profile (contour) Pc of the ground contacting surface 12c of the center block Bc is formed by a single arc whose radius of curvature Rc is in a range of from about 50 to 100 mm.

In the superimposed meridian section, the sidewall surface 13c of the center block Bc includes an axially outer sidewall surface 13co as shown in FIG. 3.

In order that the stiffness of the base portion of the center block Bc is increased and thereby the durability is improved, the axially outer sidewall surface 13co is inclined to the axial outside from the ground contacting surface 12c towards the bottom of the tread grooves 10.

The corner formed between the sidewall surface 13co and the bottom of the tread grooves 10 is rounded by a smoothly curved surface 15o in order to prevent stress concentration.

Each of the shoulder blocks Bs has a ground contacting surface 12s (top surface) and a sidewall surface 13s extending radially inwardly from the peripheral edge of the ground contacting surface 12s so as to merge into the bottom of the tread grooves 10.

In order to improve the cornering performance in rough terrain, the ground contacting surface 12s is provided with a circumferentially long shape (for example, a rectangular shape) where the circumferential length is more than the axial length as shown in FIG. 2. And the ground contacting surface 12s has a developed axial width W2 of from about 0.1 to 0.2 times the developed width Twe of the surface of the tread portion 2, and a developed circumferential length L2 of from about 1.05 to 1.1 times the developed width W2.

In the superimposed meridian section, the sidewall surface 13s of the shoulder block Bs includes an axially inner sidewall surface 13si and an axially outer sidewall surface 13so as shown in FIG. 3.

The axially inner sidewall surface 13si extends from the axial inner edge 12si of the ground contacting surface 12s towards the bottom of the tread grooves 10 while inclining to the axially inside, and
the corner between the axially inner sidewall surface 13si and the bottom of the tread grooves 10is rounded by a smoothly curved surface 16i so as to prevent stress concentration.

The axially outer sidewall surface 13so extends from the axial outer edge 12so of the ground contacting surface 12s towards the bottom of the tread grooves 10 while inclining to the axial outside. Therefore, the stiffness of the base portion of the shoulder block Bs is increased.

It is preferable that the axially outer sidewall surface 13so of the shoulder block Bs is merged into the outer surface of the sidewall portion 3 through a smoothly curved surface 16o in order to prevent stress concentration liable to occur during cornering and thereby to improve the durability.

Each of the middle blocks Bm has a ground contacting surface 12m and a sidewall surface 13m.

In order to improve the traction during straight running and the cornering performance in a well balanced manner, the ground contacting surface 12m has a substantially square shape as shown in FIG. 2. And the developed width W3 of the ground contacting surface 12m is set in a range of from about 0.15 to 0.2 times the developed width Twe of the surface of the tread portion, and the developed circumferential length L3 of the ground contacting surface 12m is set in a range of from about 0.9 to 1.1 times the developed width W3.

In the superimposed meridian section, the sidewall surface 13m has an axially inner sidewall surface 13mi and an axially outer sidewall surface 13mo as shown in FIG. 3, and the corners between these surfaces and the bottom of the tread grooves 10 are rounded by smoothly curved surfaces 17i and 17o for the same reasons as the sidewall surface 13s of the shoulder block Bs.

In the first meridian section, the middle block Bm and the shoulder block Bs partially overlap each other in the tire axial direction. More specifically, only their base portions are overlapped each other.
Thereby, when the bank is increased to the critical angle during cornering, the edges of the middle block Bm and shoulder block Bs can contact with the ground successively, and as a result, the cornering performance can be improved.

In this embodiment, in order to improve the traction during straight running and the traction during cornering in a well balanced manner, the middle block Bm and the shoulder block Bs do not align in the tire axial direction and further do not overlap each other in the tire circumferential direction.

Further, in this embodiment as shown in FIG. 1 and FIG. 3, the profile (contour) Ps of the ground contacting surface 12s of the shoulder block Bs in the first meridian section is formed by a radially outwardly swelling curved line having a radius of curvature Rs of not less than 200 mm or a straight line (Rs=infinity).

As explained above, as the profile (contour) Ps of the shoulder block Bs becomes substantially flat, at the time of cornering, the shoulder block Bs can contact with the ground evenly from the axial inner edge 12si to the axially outer edge 12so of the ground contacting surface 12s, and the ground pressure at the edges 12si and 12so can be increased in comparison with the conventional tire. Accordingly, the tire 1 can be improved in the cornering performance. Further, as the ground pressure distribution is evened, the uneven wear resistance of the shoulder block Bs can be improved.

In order to derive the above-explained functions effectively, the radius of curvature Rs of the shoulder block Bs is preferably set in a range of not less than 200 mm, more preferably not less than 500 mm, most preferably infinity (straight).

In the superimposed meridian section, the difference (L6-L5) between the shortest distance L5 from the axial inner edge 12si of the ground contacting surface 12s of the shoulder block Bs to the bottom 10b (at the deepest position) of the axial tread grooves 10A and the shortest distance L6 from the axial outer edge 12so of the ground contacting surface 12s to the bottom 10b (at the deepest position) is preferably set in a range of not more than 2 mm, more preferably not more than 1 mm.

If the difference (L6-L5) is more than 2 mm, then the rigidity difference between the inner edge 12si side and outer edge 12so side becomes excessively increased, and it becomes difficult to improve the cornering performance and uneven wear resistance.

Figure 4:
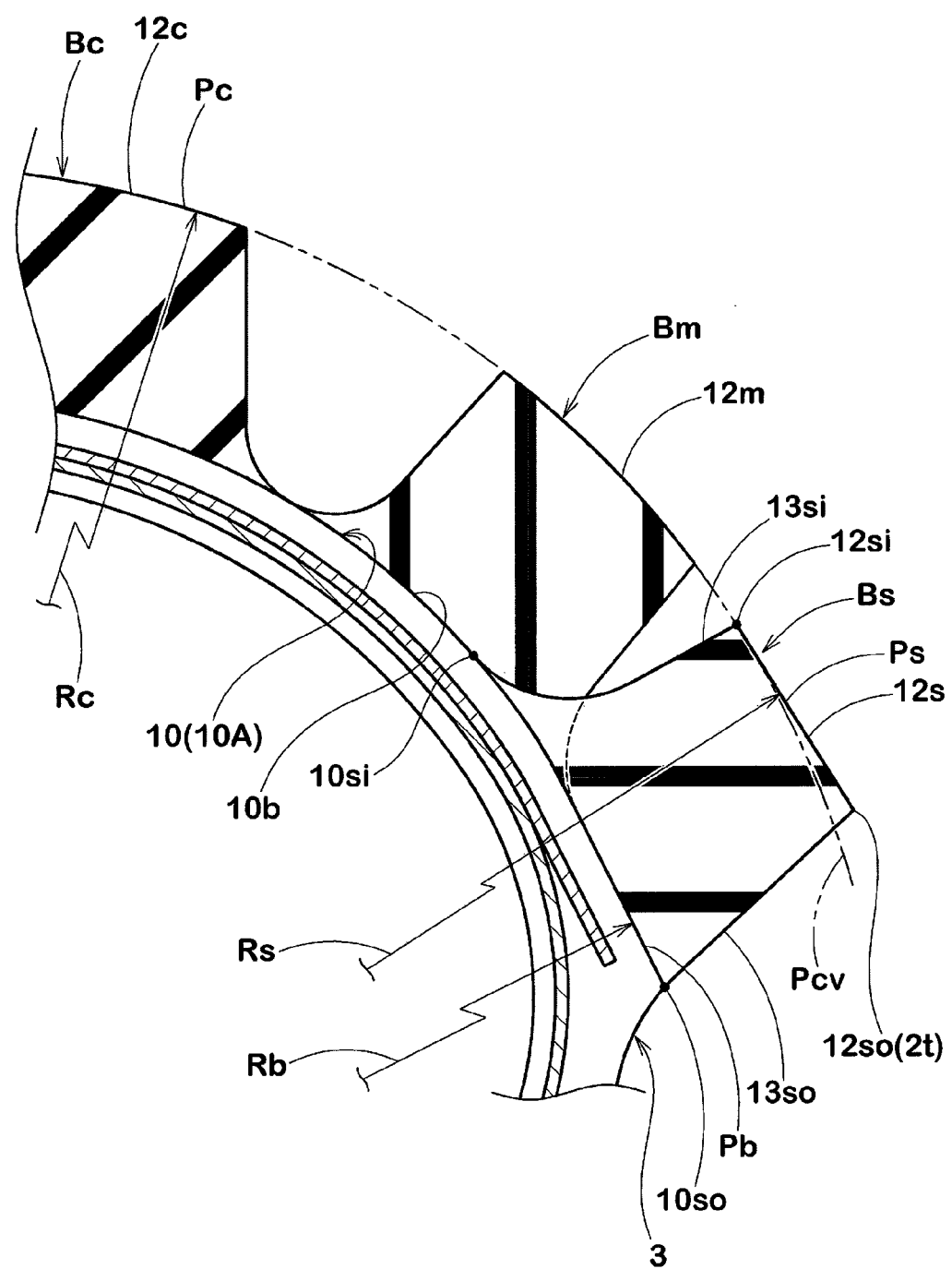
FIG. 4 is an enlarged cross sectional view of the tread portion.

In the superimposed meridian section, it is preferable that, as shown in FIG. 4, the profile (contour) Pb of the bottom of the axial tread grooves 10A extending between the inner end 10si which is an intersecting point of the axially inner sidewall surface 13si of the shoulder block Bs with the bottom of the axial tread groove 10A and
the outer end 10so which is an intersecting point of the axially outer sidewall surface 13so of the shoulder block Bs with the bottom of the axial tread grooves 10A
is formed by a radially outwardly swelling curved line having a radius of curvature Rb of not less than 200 mm or a straight line (Rb=infinity).
Thereby, the stiffness of the shoulder block BS can be substantially evened between the inner end 10si and the outer end 10so, and the cornering performance and uneven wear resistance are effectively improved.

In order to derive the above-explained functions effectively, preferably, the radius of curvature Rb of the axial tread groove 10A is set in a range of not less than 200 mm, more preferably not less than 500 mm, most preferably infinity (straight).

Further, it is preferred that the reinforcing ply 7A located radially inside the region between the inner end 10si and the outer end 10so is kept in parallel with the profile (contour) Pb of the axial tread groove 10A. As a result, the stiffness of the shoulder block Bs between the inner end 10si and the outer end 10so can be further evened.

Figure 5:
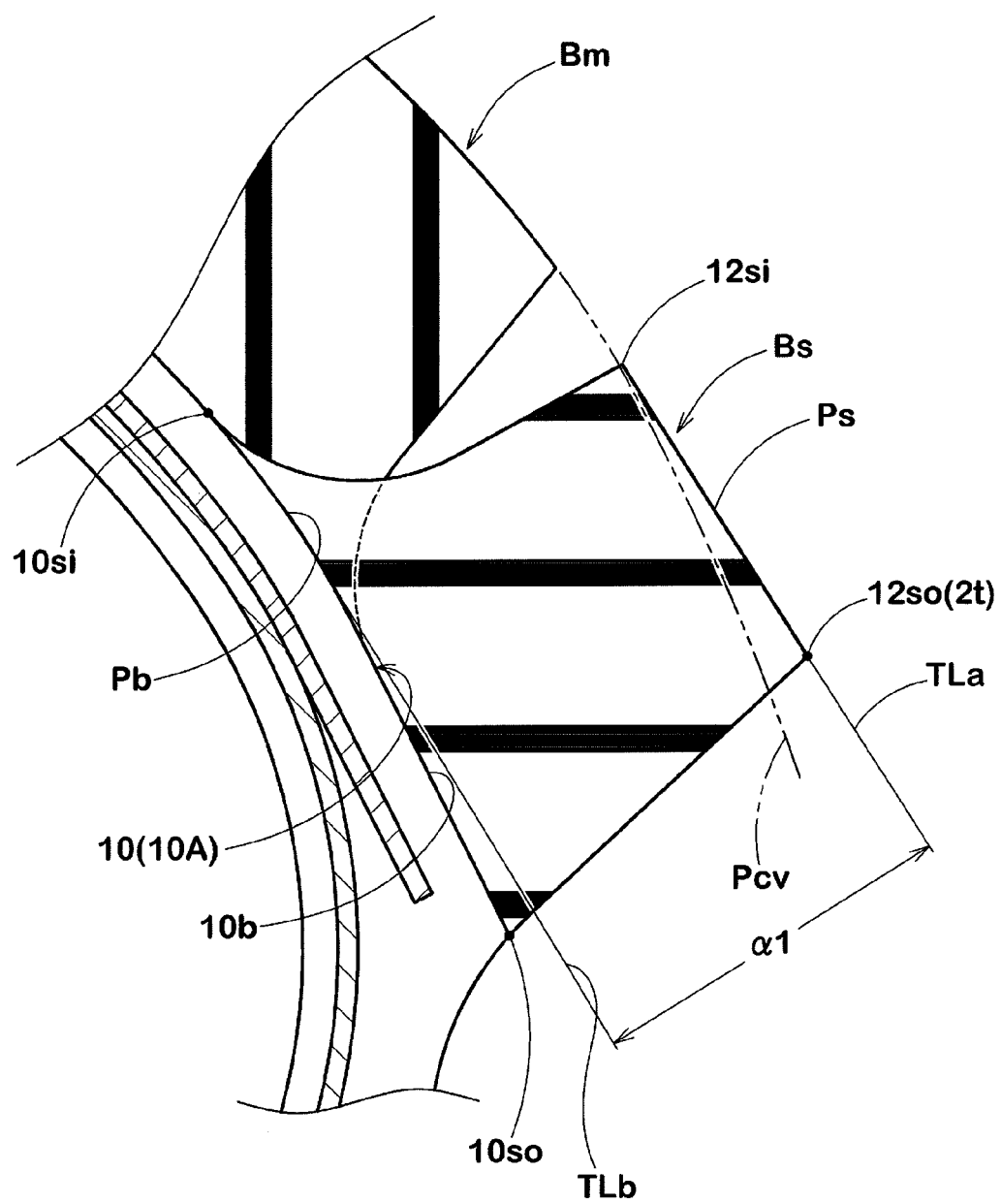
FIG. 5 is an enlarged cross sectional view showing the shoulder block.
Figure 6:
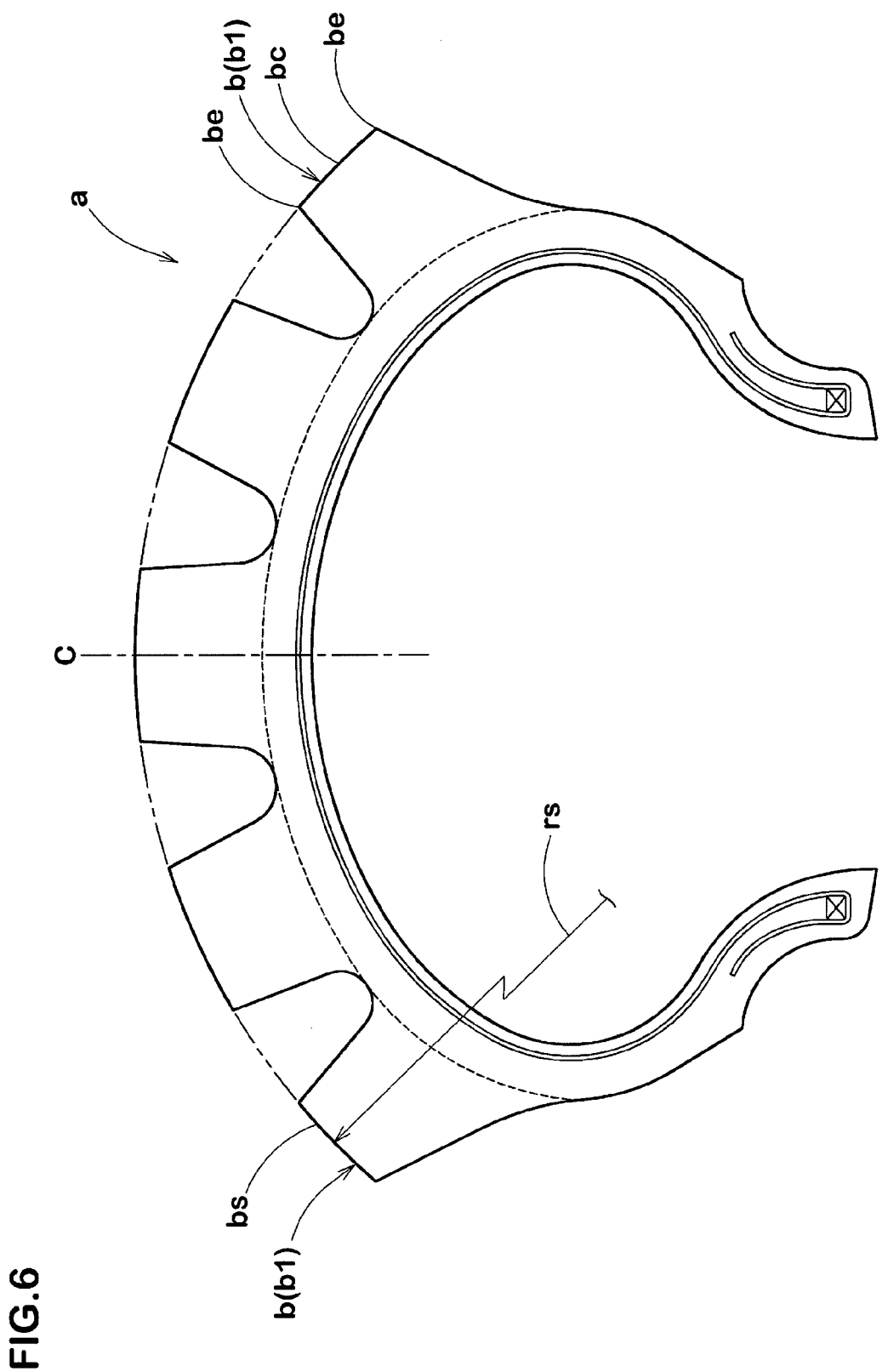
FIG. 6 is a cross sectional view showing a conventional tire.

In the superimposed meridian section, as shown in FIG. 5, the angle α1 formed between
a tangent TLa to the profile (contour) Ps of the ground contacting surface 12s at the inner edge 12si of the shoulder block Bs and
a tangent TLb to the profile (contour) Pb of the axial tread grooves 10A at the inner end 10si of the bottom 10b is preferably set in a range of not more than 5 degrees, more preferably not more than 1 degrees.
If the angle α1 is more than 5 degrees, the ground pressure distribution in the ground contacting surface 12s of the shoulder block Bs can not be evened, and it becomes difficult to improve the uneven wear resistance and cornering performance.

In the first meridian section, as shown in FIG. 4 and FIG. 5, the outer edge 12so of the ground contacting surface 12s of the shoulder block BS is preferably located radial outside a virtual center profile Pcv formed by a single radius arc which is an extended line towards the tread edge side, of the profile Pc of the ground contacting surface 12c of the center block Bc. Thereby, the outer edge 12so of the shoulder block Bs can display good edge effect during cornering and the cornering performance can be improved.

In the first meridian section, as shown in FIG. 1, the profile Pm of the ground contacting surface 12m of the middle block Bm can be formed by a curved line having a radius of curvature Rm of not less than 200 mm or a straight line (Rm=infinity).
Such middle block Bm can contact with the ground evenly all over the ground contacting surface 12m, therefore, the edge effect is effective at small bank angles, and it is possible to provide improved cornering grip performance from the initial period of cornering. Further, the wear resistance can be improved.

While a preferred embodiment of the present invention has been described using specific terms, such description is for illustrative purposes only, and it is to be understood that changes and variations may be made without departing from the spirit or scope of the following claims.

Comparison Tests

Based on the tire structure shown in FIG. 1, motorcycle tires were made, changing the specifications of the tread blocks as shown in Table 1. And the tires were tested for the cornering performance and uneven wear resistance as follows.

All of the tires had same specifications excepting the specifications shown in Table 1. The common specifications are as follows.
tire size: 120/80-19 63M MX51
wheel rim size: 19×2.15
tread developed width Twe: 171 mm
block height Bh: 16.2 mm-17.2 mm
center block
developed width W1: 38 mm-50 mm
developed length L1: 20 mm-22 mm
W1/TWe: 0.22-0.29
L1/W1: 0.4-0.58
radius of curvature Rc: 73 mm
shoulder block
developed width W2: 17 mm
developed length L2: 23 mm
W2/TWe: 0.099
L2/W2: 1.35
middle block
developed width W3: 20 mm
developed length L3: 22 mm
W3/TWe: 0.117
L3/W3: 1.1

<Cornering Performance Test>

Each test tire was mounted on a rear wheel of a 450 cc motorcycle (tire pressure 80 kPa), and during run on a rough terrain tire test course, a professional test rider evaluated the cornering performance based on cornering grip, cornering traction and cornering stability.
The results are shown in Table 1 by an index based on Ref.1 being 100, wherein the larger the value, the better the cornering performance.

<Uneven Wear Resistance Test>

After the test tire was run for 250 km on the rough terrain tire test course (incl. running under critical cornering conditions), the shoulder blocks were visually checked for uneven wear.
The results are shown in Table 1 by an index based on Ref.1 being 100, wherein the larger the value, the better the resistance to uneven wear.

From the test results, it was confirmed that the motorcycle tires according to the present invention can be improved in the cornering performance and uneven wear resistance.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| shoulder block | | | | | | | | | | |
| radius Rs (mm) | 75 | infinity | 200 | 500 | infinity | infinity | infinity | infinity | infinity | infinity |
| L5 (mm) | 17.2 | 17.2 | 17.2 | 17.2 | 17.2 | 17.2 | 17.2 | 17.2 | 17.2 | 17.2 |
| L6 (mm) | 18.0 | 19.3 | 16.8 | 17.0 | 17.2 | 17.5 | 17.3 | 17.2 | 17.2 | 17.2 |
| L6-L5 | 0.8 | 2.1 | −0.4 | −0.2 | 0 | 0.3 | 0.1 | 0 | 0 | 0 |
| middle block | | | | | | | | | | |
| radius Rm (mm) | 74 | 74 | 74 | 74 | 74 | 74 | 74 | 80 | 70 | 65 |
| tread groove bottom | | | | | | | | | | |
| radius Rb (mm) | 50 | 50 | infinity | infinity | infinity | 200 | 500 | infinity | infinity | infinity |
| angle α1 between tangents TLa and TLb (deg.) | — | — | 0 | 0 | 0 | 0 | 0 | 0 | 0 | 0 |
| test results | | | | | | | | | | |
| Cornering grip | 100 | 105 | 100 | 105 | 110 | 110 | 110 | 115 | 110 | 100 |
| Cornering traction | 100 | 100 | 100 | 105 | 110 | 110 | 110 | 110 | 105 | 100 |
| Cornering stability | 100 | 95 | 105 | 105 | 110 | 105 | 108 | 105 | 95 | 95 |
| Uneven wear resistance | 100 | 110 | 105 | 110 | 115 | 110 | 110 | 115 | 115 | 110 |

The invention claimed is:

1. A motorcycle tire for running on rough terrain comprising:
a plurality of independent blocks disposed in a tread portion of the tire and including axially outermost shoulder blocks circumferentially separated by axial tread grooves,
wherein each of the shoulder blocks is provided with a ground contacting surface whose profile is a curved line having a radius of curvature not less than 200 mm or a straight line in a first meridian section of the tire including the centroid of the ground contacting surface of the shoulder block and also including the rotational axis of the tire under a normally inflated unloaded condition, and
wherein in a superimposed meridian section where said first meridian section is superimposed on a second meridian section of the tire including the rotational axis of the tire and including the bottom of the axial tread grooves, the difference between
the shortest distance from the axial inner edge of the ground contacting surface of the shoulder block to the bottom of the axial tread grooves and
the shortest distance from the axial outer edge of the ground contacting surface of the shoulder block to said bottom is not more than 2 mm.

2. The motorcycle tire for running on rough terrain according to claim 1, wherein the independent blocks include center blocks each provided with a ground contacting surface, and in the first meridian section, said axial outer edge of the ground contacting surface of the shoulder block is located radially outside a virtual center profile which is an extension toward the tread edge, of a profile of the ground contacting surface of one of the center blocks in the first meridian section.

3. The motorcycle tire for running on rough terrain according to claim 1, wherein in the superimposed meridian section, the profile of the bottom of the axial tread grooves between an inner end defined by an intersecting point of an axially inner sidewall surface of the shoulder block and the bottom of the axial tread grooves and an outer end defined by an intersecting point of an axially outer sidewall surface of the shoulder block and the bottom of the axial tread grooves is a curved line having a radius of curvature of not less than 200 mm or a straight line.

4. The motorcycle tire for running on rough terrain according to claim 3, wherein in the superimposed meridian section, the angle formed between a tangent to the profile of the ground contacting surface of the shoulder block at said axial inner edge and a tangent to the profile of the bottom of the axial tread grooves at said inner end is not more than 5 degrees.

5. The motorcycle tire for running on rough terrain according to claim 3, wherein in the superimposed meridian section, the axially outer sidewall surface of the shoulder block is connected to the surface of a sidewall portion of the tire smoothly through a concave arc.

6. The motorcycle tire for running on rough terrain according to claim 2, wherein in the superimposed meridian section, the profile of the bottom of the axial tread grooves between an inner end defined by an intersecting point of an axially inner sidewall surface of the shoulder block and the bottom of the axial tread grooves and an outer end defined by an intersecting point of an axially outer sidewall surface of the shoulder block and the bottom of the axial tread grooves is a curved line having a radius of curvature of not less than 200 mm or a straight line.

7. The motorcycle tire for running on rough terrain according to claim 6, wherein in the superimposed meridian section, the angle formed between a tangent to the profile of the ground contacting surface of the shoulder block at said axial inner edge and a tangent to the profile of the bottom of the axial tread grooves at said inner end is not more than 5 degrees.

8. The motorcycle tire for running on rough terrain according to claim 6, wherein in the superimposed meridian section, the axially outer sidewall surface of the shoulder block is connected to the surface of a sidewall portion of the tire smoothly through a concave arc.

* * * * *